United States Patent [19]

Edwards

[11] 3,929,952
[45] Dec. 30, 1975

[54] METHOD FOR MOLDING A PLASTIC CONTAINER

[75] Inventor: Bryant Edwards, Clarendon Hills, Ill.

[73] Assignee: Illinois Tool Works Inc., Chicago, Ill.

[22] Filed: July 15, 1974

[21] Appl. No.: 488,371

Related U.S. Application Data

[62] Division of Ser. No. 338,774, March 7, 1973, Pat. No. 3,867,086.

[52] U.S. Cl. .................. 264/94; 264/238; 264/327
[51] Int. Cl.² .......................................... B29C 17/07
[58] Field of Search ............ 264/89, 90, 92, 94, 98, 264/97, 99, 294, 296, 327, 132, 238, 154–156; 425/387, 387 B, 388, 242 B, DIG. 208, 209, 214; 222/565

[56] References Cited
UNITED STATES PATENTS

| | | | |
|---|---|---|---|
| 2,331,702 | 10/1943 | Kopitke | 264/97 |
| 2,776,787 | 1/1957 | Nicol | 222/565 X |
| 3,159,695 | 12/1964 | Behringer | 264/92 X |
| 3,503,826 | 3/1970 | Nasica | 264/92 X |
| 3,676,542 | 7/1972 | Maltby | 264/327 X |
| 3,770,860 | 11/1973 | Amberg et al. | 264/89 |

*Primary Examiner*—Jan H. Silbaugh
*Attorney, Agent, or Firm*—E. L. Benno; R. W. Beart

[57] ABSTRACT

Manufacture of a shaker type plastic container as a reform from a generally frusto-conical nestable preform which includes a portion of predetermined configuration at the reduced end apertured to provide the preformed shaker openings which are separately covered during the transition from preform to reform, and an opposite open end portion of predetermined peripheral configuration to be later closed by a cover forming the bottom of the completed container, and wherein the preform is associated with a heated mandrel in a female blow mold of reform internal shape and cooperatively configured relative the mandrel at the ends thereof to maintain the predetermined configurations of the end portions of the preform in the reform and to maintain the covering of the shaker openings and the integrity of that end portion of the preform during the blowing operation and with heating of the preform to blow molding temperatures between the end portions which are maintained at substantially minimum temperatures during the blow molding operation to preserve the predetermined configurations and integrity thereof.

2 Claims, 4 Drawing Figures

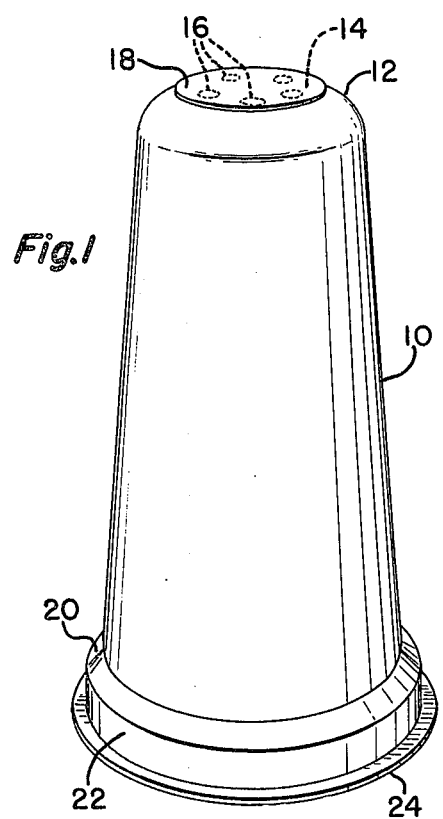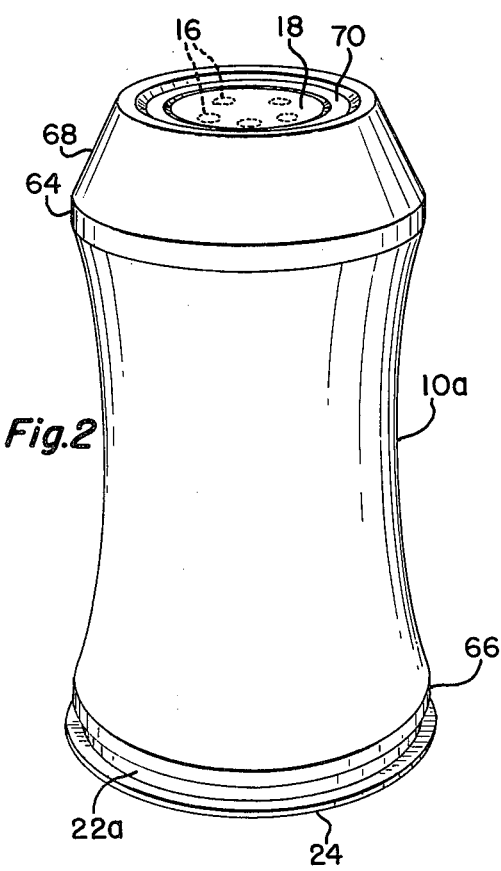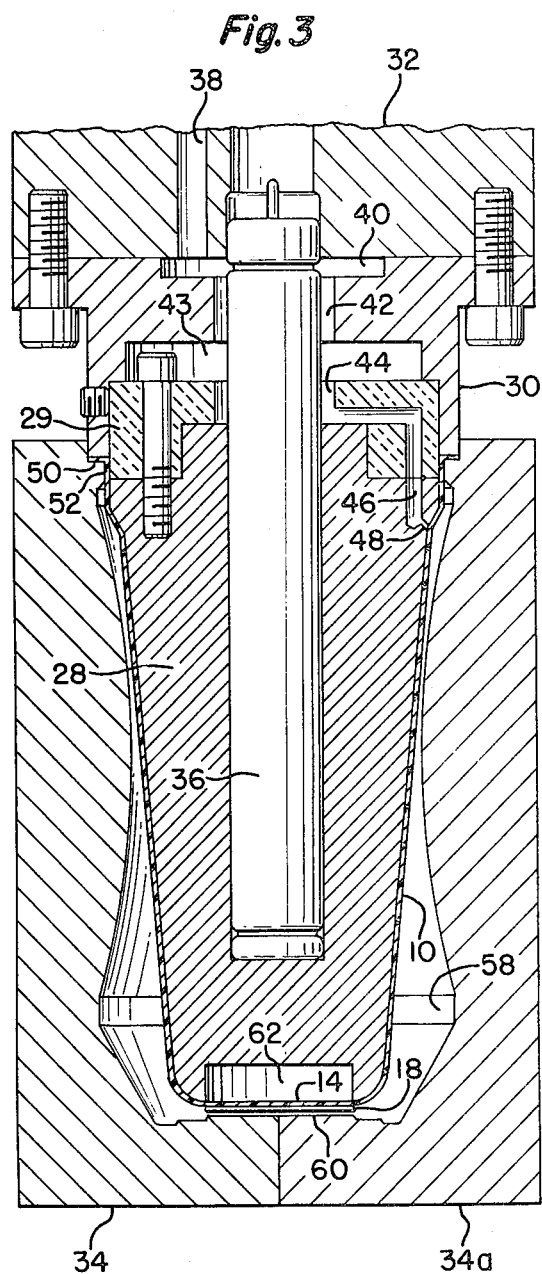

3,929,952

METHOD FOR MOLDING A PLASTIC CONTAINER

This is a division of application Ser. No. 338,774, filed Mar. 7, 1973, now U.S. Pat. No. 3,867,086.

SUMMARY OF THE INVENTION

Various molding procedures have been employed in forming plastic containers, as by injection, blow or vacuum molding techniques. In blow molding, for example, such containers have been formed from a plastic sheet heated to permit plunger deformation thereof into a female mold as a parison blank which is then blown to container configuration by admitting air under pressure to the interior of the parison, as for example, through the plunger. In such procedure, usually the entire parison blank below the supported end is blown to conform the same to the interior surface of the female mold. Also, in blow molding such containers, a preform has been made in suitable manner and then placed on a heated mandrel and associated with a female mold and blown to container configuration by admission of air under pressure. Here too, generally the entire preform below the supported end thereof is blown to container configuration and generally the entire preform at least below the supported end is heated by the mandrel for the blowing operation.

The present invention relates to the formation of plastic containers from a preform shaped for nesting with others during storage and shipment, and which has end portions of initial predetermined respective configurations maintained as such during the transition from preform to reform shaping of the container, and more particularly, to the formation of such containers by differential pressure molding wherein a heated mandrel and associated preform are disposed within a female mold cavity against which the preform is shaped to the container reform configuration as by the admission of air under pressure through the mandrel to the interior of the preform.

An object of the invention is to provide a method for the formation of plastic containers in the above manner wherein the preform end portions of predetermined configurations are shielded from the molding temperatures of the mandrel and supported against deformation with resultant reform shaping of the body wall of the preform between the end portions thereof to the reformed container wall configuration.

Another object of the invention is to provide a method for the formation of plastic containers in the above manner wherein the inner end of the preform is supported against the female mold during reform shaping of the container body wall.

A further object of the invention is to provide a method for the formation of shaker type containers in the above manner wherein the preform is apertured at one end to provide the shaker openings which are covered during heating and reform shaping of the container wall to preserve the integrity thereof in the finished container.

The above and other objects of the invention will, in part, be obvious and will be hereinafter more fully pointed out in the detail description of the drawings.

BRIEF DESCRIPTION OF THE DRAWINGS

FIG. 1 is a perspective view of a preform used in the formation of a shaker type container;

FIG. 2 is a perspective view of a completed shaker type of container;

FIG. 3 is a sectional view through a molding apparatus with the preform shown in section on a mandrel disposed within a female mold.

DETAILED DESCRIPTION OF THE PREFERRED EMBODIMENT

Figure 4:
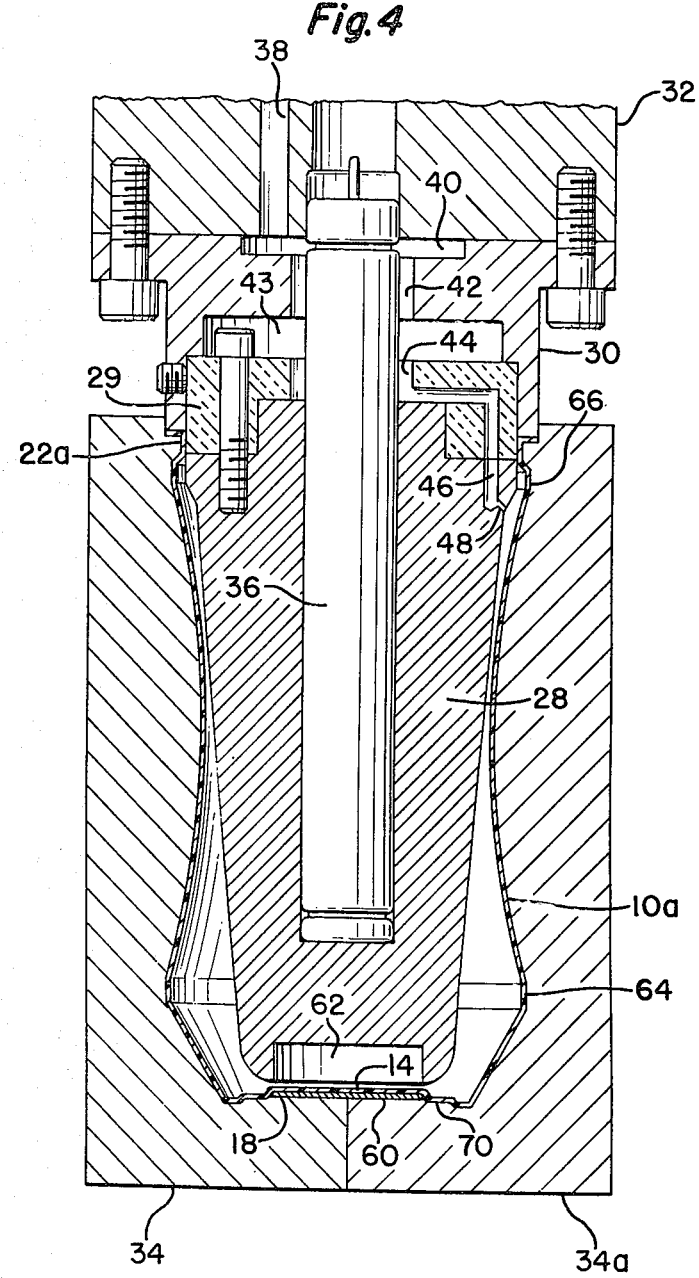
FIG. 4 is a perspective view similar to FIG. 3, but showing the container reform in section after the shaping operation.

With reference to FIG. 1, the plastic preform is illustrated as including a substantially frusto-conical body wall 10 merging at the smaller end with a curved wall surface 12 in turn merging with an end surface 14 of predetermined configuration, illustrated as being substantially flat, and which configuration is maintained throughout the reform shaping operation to appear in the finished container. The end surface 14 is provided with apertures 16 when a shaker type container is to be the end product and these apertures are covered by a disc 18 of paper or other suitable material adhered in suitable manner to the end surface 14 and so remaining throughout the reform shaping operation. The opposite larger end of the body wall merges with an outwardly inclined peripheral wall surface 20 in turn merging with a generally cylindrical wall surface 22 which terminates in an outward peripheral flange or lip 24. The lip 24 and at least a portion of the cylindrical wall 22 are of predetermined peripheral configuration which is also maintained throughout the reform shaping operation to appear in the finished container. The generally tapered configuration of the preform renders the same nestable with others in stacks for packaging for shipment, storage and individual removal for automatic feeding to molding equipment used for transforming the preform to a reform of the desired end product container configuration.

With reference to FIG. 3, the preform of FIG. 1 is shown inverted and associated with a mandrel 28 which is secured to an insulator block 29, which in turn is carried by a supporting block 30. The block 30 is secured to a member 32 forming part of known machines moving the assembly into position within a female blow mold having split mold sections 34, 34a normally separated to receive the mandrel and preform assembly. In FIG. 3, the female mold sections are shown in clamped operative position for the blowing operation to transform the preform into the container reform, and for this purpose, the mold cavity provided by the female mold sections conforms to the shape of the container to be reformed therein. The mandrel 28 is illustrated as the type having an elongate central aperture receiving a cartridge type heater 36 which may be electrically powered for heating the mandrel to a degree for raising the temperature of the wall of the preform or parison to blow molding temperatures. The rim portion of the preform is insulated from the heater 36 by the insulator block 29. Air under pressure is admitted to the interior of the preform through passage 38 in the member 32 to an annular manifold 40 between member 32 and block 30, around the cartridge heater 36 and then downwardly through passages 42 in the block 30 along the surface of the cartridge heater 36. Each passage 42 communicates with another annular manifold 43 in the member 30 and the manifold 43 communicates with a number of passageways, such as passageway 44, through the block 29. Each passageway 44 is connected to a passageway 46 in the mandrel 28. Each passage 46 terminates in a small passage 48 opening through the surface of the mandrel to the interior of the preform.

The female mold sections 34, 34a are in mirror image, and when closed, present a peripheral internal recess receiving the blocks 30 and 29 and presenting an upward ledge 50 on which the lip or flange 24 of the preform is received and clamped. There is an inward peripheral shoulder 52 beneath the ledge 50 bearing against the upper portion of the cylindrical wall 22 of the preform. Below the shoulder 52, the internal surface of the cavity formed by the female mold sections is contoured according to the ultimate wall shape of the container to be reformed therein and is illustrated as being inwardly convex throughout the major portion thereof to a cylindrical surface 58 and thence downwardly and inwardly to the bottom of the mold cavity. The bottom of the mold cavity is stepped slightly upwardly to a substantially flat surface 60 generally coextensive with the closure disc 18 on the preform. The adjacent end of the mandrel is provided with a downwardly open recess 62 facing the flat end 14 of the preform and the apertures 16 therein. The inner peripheral wall surface defining the recess 62 is substantially coextensive with the bottom 60 of the female mold cavity such as to grip or be in close adjacency to the periphery of the preform end 14 and the disc 18 adhered thereto. The recess 62 in the mandrel provides an insulation space shielding the apertured bottom 14 of the preform against the maximum heat of the mandrel. Thus, the preform bottom 14 is protected against the blow molding temperatures of the mandrel so that the integrity of the bottom is maintained and the apertures 16 are not distorted.

With the parts in the position of FIG. 3, air under pressure is admitted through the passages 38, 40, 42, 44, 46, and 48. The wall 10 of the preform is heated by the mandrel to blow molding temperatures and reshaped by the air under pressure to conform to the interior and relatively cooled wall surface of the female cavity as shown in FIG. 4. The reform shape of the preform in FIG. 4 is the inverted form of the finished container shown in FIG. 2. During this reshaping, the wall 10 of the preform assumes the concave shape of the wall 10a in FIG. 2 between a short, upper cylindrical portion 64 and a short lower cylindrical portion 66, the latter being the blown remainder of the original cylindrical wall 22 of the preform, leaving the adjacent peripheral end portion in its original predetermined configuration which was clamped against pressure deformation and shielded by the insulation 44 against the heat of the mandrel. In like manner, the apertured flat portion 14 of the preform is maintained in its original predetermined configuration by being protected against the heat of the mandrel by the insulating recess 62 and protected against blowing deformation by engagement thereof with the interposed disc 18 against the conforming flat surface 60 of the female mold cavity even though there may be slight separation from the end of the mandrel during formation of the adjacent stepped portion of the reform as shown in FIG. 4. The mold sections are separated and the resultant inverted container of FIG. 2 includes a remnant cylindrical wall 22a between the lip or flange 24 and the lower cylindrical portion 66. From the upper cylindrical portion 64, there is a tapered wall surface 68 merging into the stepped portion 70 surrounding the apertured end portion 14 with the closure disc 18 still adhered thereto. The container is filled through the open bottom and a closure applies to the flange 24. The closure disc 18 may then be removed, leaving the original preform apertures 16 exposed for disposing the contents. It will be seen that the predetermined original peripheral configuration of the preform flange 24 and an adjacent portion of the cylindrical wall 22 are maintained for fitment of a bottom closure thereto. Also, the original predetermined configuration of the flat end portion 14 and the apertures 16 therethrough, as well as the disc 18, are maintained in the reformed container. This is accomplished by shielding those end portions against the blowing molding temperature of the mandrel and supporting the same against deformation during the reform shaping of the preform.

I claim:
1. A method for making a plastic shaker-type container from a preform shaped to nest with others for shipment and storage and with each preform having an open end portion of predetermined peripheral configuration and an opposite smaller end portion of predetermined configuration with a plurality of shaker openings therethrough, including the steps of adhering a cover over said smaller end portion to seal said shaker openings, positioning said preform on a heated mandrel, shielding the preform end portions against the heat of the mandrel while heating the wall of said preform between the shielded end portions thereof to a reform shaping temperature associating the heated mandrel and preform mounted thereon with a female mold internally shaped according to the finished plastic shaker-type container, supporting said end portions of said preform in said female mold against deformation during reform shaping of the preform, and shaping the wall of said preform between the shielded and supported end portions thereof under differential air pressure between the interior and the exterior of said preform against said female mold to the configuration of said plastic shaker-type container with maintained integrity of the predetermined configurations of said end portions.

2. The method as claimed in claim 1, wherein the shaping of the wall of the preform is accomplished by admitting air under pressure through the mandrel to the interior surface of the preform wall.

* * * * *